(12) United States Patent
Eddings et al.

(10) Patent No.: US 11,613,224 B2
(45) Date of Patent: Mar. 28, 2023

(54) OPEN FRAME VEHICLE MULTIFUNCTIONAL SPORT TUBE

(71) Applicant: FORD GLOBAL TECHNOLOGIES, LLC, Dearborn, MI (US)

(72) Inventors: Forrest W. Eddings, Taylor, MI (US); Ted Victor Kolar, Dearborn, MI (US); Dragan B. Stojkovic, Taylor, MI (US); Colleen Marie Hoffman, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 121 days.

(21) Appl. No.: 17/177,371

(22) Filed: Feb. 17, 2021

(65) Prior Publication Data
US 2022/0258686 A1    Aug. 18, 2022

(51) Int. Cl.
*B60R 21/13*    (2006.01)
*B60J 10/90*    (2016.01)
(Continued)

(52) U.S. Cl.
CPC .............. *B60R 21/13* (2013.01); *B60J 10/32* (2016.02); *B60J 10/90* (2016.02); *B60R 21/213* (2013.01);
(Continued)

(58) Field of Classification Search
CPC . B60R 21/213; B60R 13/0206; B60R 13/025; B60R 21/04; B60R 21/232;
(Continued)

(56) References Cited

U.S. PATENT DOCUMENTS 4,626,026 A * 12/1986 Hasegawa .................. B60J 7/11
                                                  296/213
6,309,007 B1 * 10/2001 Essig ....................... B60J 10/00
                                                  296/218
(Continued)

FOREIGN PATENT DOCUMENTS

DE        10105716      9/2001
DE     102014013582     4/2015
(Continued)

*Primary Examiner* — Paul N Dickson
*Assistant Examiner* — Tiffany L Webb
(74) *Attorney, Agent, or Firm* — Vichit Chea; Price Heneveld LLP

(57) ABSTRACT

A roof rail assembly for a motor vehicle having an open frame vehicle architecture includes a side air curtain fixedly coupled with an elongated hollow sport tube extending along a longitudinal axis of the motor vehicle. The sport tube comprises a two-piece multi-gage tube extending along a longitudinal length of an occupant compartment of the motor vehicle. The side airbag curtain is fixedly coupled with the sport tube, the side airbag curtain having a stowed condition and an inflated condition. An integrated seal carrier is fixedly coupled with the sport tube and extends laterally outboard of the motor vehicle, the integrated seal carrier comprising a removable roof sealing member and a removable door window seal, wherein the removable roof sealing member and a removable door window seal are independent of one another.

18 Claims, 7 Drawing Sheets

(51) Int. Cl.
  *B60R 21/213* (2011.01)
  *B60J 10/32* (2016.01)
  *B62D 25/04* (2006.01)

(52) U.S. Cl.
  CPC ........ *B62D 25/04* (2013.01); *B60R 2021/132* (2013.01)

(58) Field of Classification Search
  CPC .... B60R 2021/0442; B60R 2021/23192; B60J 10/90; B62D 25/04
  See application file for complete search history.

(56) References Cited

U.S. PATENT DOCUMENTS

| | | | |
|---|---|---|---|
| 6,341,796 B1 | 1/2002 | Preisler | |
| 6,457,738 B1 | 10/2002 | Labrie et al. | |
| 6,523,887 B1* | 2/2003 | Picken | B60R 13/025 |
| | | | 280/730.2 |
| 6,616,182 B2 | 9/2003 | Woolley et al. | |
| 6,654,995 B1* | 12/2003 | Wang | B23K 11/065 |
| | | | 29/521 |
| 6,742,258 B2* | 6/2004 | Tarbutton | B21D 39/04 |
| | | | 29/897 |
| 6,793,241 B2 | 9/2004 | Wallner et al. | |
| 7,219,925 B2* | 5/2007 | Hill | B60R 21/055 |
| | | | 280/730.2 |
| 7,399,030 B2 | 7/2008 | Reitzloff et al. | |
| 7,941,907 B2* | 5/2011 | Yang | B21D 26/14 |
| | | | 29/458 |
| 8,020,272 B2* | 9/2011 | Ghiran | B21D 39/04 |
| | | | 29/516 |
| 8,991,896 B1* | 3/2015 | Whitehead | B60J 7/196 |
| | | | 296/121 |
| 9,884,654 B1 | 2/2018 | Stojkovic et al. | |
| 10,035,408 B2 | 7/2018 | Crismon et al. | |
| 10,532,640 B2* | 1/2020 | Craig | B60J 7/106 |
| 10,538,216 B2 | 1/2020 | White et al. | |
| 10,689,036 B2* | 6/2020 | Stojkovic | B62D 27/065 |
| 11,390,236 B2* | 7/2022 | Tallapragada | B60R 21/232 |
| 2005/0052001 A1 | 3/2005 | Totani et al. | |
| 2006/0261580 A1 | 11/2006 | Tiesler et al. | |
| 2015/0224860 A1 | 8/2015 | Bowles et al. | |
| 2021/0402859 A1* | 12/2021 | James | B60J 10/21 |

FOREIGN PATENT DOCUMENTS

| | | |
|---|---|---|
| EP | 0857624 | 1/1998 |
| EP | 1914125 | 10/2007 |
| FR | 2998843 | 6/2014 |
| JP | 2004501018 | 1/2004 |
| KR | 20070121960 | 12/2007 |

\* cited by examiner

OPEN FRAME VEHICLE MULTIFUNCTIONAL SPORT TUBE

FIELD OF THE INVENTION

The present invention generally relates to a motor vehicle having an open frame vehicle architecture and, more particularly, to a roof rail having an elongated hollow sport tube to which is attached a side airbag curtain and an integrated seal carrier for interface with a removable roof assembly and a frameless retractable window of a removable side door assembly.

BACKGROUND OF THE INVENTION

Traditional motor vehicle architecture may include a side air curtain/curtain air bag (SAC/CAB) that interfaces with a soft/flexible headliner and hard trim on the upper pillar trim. The soft/flexible headliner allows for the actuation of the SAC/CAB during an impact event. Certain nontraditional motor vehicles may employ an open frame vehicle architecture that provides the ability for a roof assembly and side door assemblies to be removed by the customer. Thus, motor vehicles that employ an open frame vehicle architecture require unique design configurations to provide such additional occupant restraining features for occupants via a side air curtain restraint, where traditional applications for a SAC/CAB may not be entirely appropriate. In addition, unique design configurations are required to provide effective sealing for the removable roof assembly and the frameless retractable windows of the removable side door assemblies.

SUMMARY OF THE INVENTION

According to one aspect of the present invention, a roof rail assembly for a motor vehicle has an open frame vehicle architecture including a side air curtain fixedly coupled with an elongated hollow sport tube extending along a longitudinal axis of the motor vehicle. The sport tube comprises a two-piece multi-gage tube extending along a longitudinal length of an occupant compartment of the motor vehicle. The side airbag curtain is fixedly coupled with the sport tube, the side airbag curtain having a stowed condition and an inflated condition. An integrated seal carrier is fixedly coupled with the sport tube and extends laterally outboard of the motor vehicle. Each of the integrated seal carriers comprises a removable roof sealing member and a removable door window seal, wherein the removable roof sealing member and the removable door window seal are independent of one another.

Embodiments of the first aspect of the present disclosure can include any one or a combination of the following features:

The sport tube is fabricated from a metal material.
The sport tube comprises an inboard side and an outboard side, wherein the side airbag curtain is fixedly coupled with the inboard side of the sport tube and the integrated seal carrier is fixedly coupled with the outboard side of the sport tube.
The sport tube comprises a forward length having a rearward end and a rearward length having a forward end, wherein either of the rearward end of the forward length or the forward end of the rearward length comprises a reduced outer diameter that may be received within an inner diameter of the other to form a tent-poled joint.
The tent-poled joint is seam welded after assembly.
The sport tube is hot formed after the tent-poled joint is formed.
The side airbag curtain is coupled to an inboard side of the sport tube, and the side airbag curtain extends substantially along a longitudinal length of the sport tube.
A plurality of discrete integrated seal carriers are each disposed along a length of the sport tube proximate the location of a retractable door window of each of a plurality of removable side door assemblies, wherein each of the plurality of integrated seal carriers has a longitudinal length substantially corresponding to a location and a longitudinal length of the retractable door window of one of the removable side door assemblies, respectively.
The removable roof sealing member of the plurality of integrated seal carriers defines in part an upwardly facing sealing plane along the longitudinal axis of the motor vehicle for interface with a sealing member on a removable roof assembly and the removable door window seal defines a downwardly facing sealing plane for interface with a retractable door window, the removable roof sealing member and the removable door window seal acting independently of each other.

According to another aspect of the present invention, a roof rail assembly for a motor vehicle having an open frame vehicle architecture comprises an elongated hollow two-piece sport tube extending along a longitudinal axis of the motor vehicle, the sport tube comprising an inboard side and an outboard side, and a forward end of the sport tube extends from an A-pillar disposed proximate a forward portion of an occupant compartment and a rearward end of the sport tube extends rearward beyond a C-pillar disposed proximate a rearward portion of the occupant compartment. A side airbag curtain is fixedly coupled with the inboard side of the sport tube, the side airbag curtain having a stowed condition and an inflated condition. A plurality of integrated seal carriers are fixedly coupled with the outboard side of the sport tube and extend laterally outboard of the motor vehicle. Each of the integrated seal carriers comprises a removable roof sealing member defining in part an upwardly facing sealing plane along the longitudinal axis of the motor vehicle for interface with a sealing member on a removable roof and a removable door window seal defining a downwardly facing sealing plane for interface with a retractable door window, wherein the removable roof sealing member and the removable door window seal act independently of each other.

Embodiments of the second aspect of the present disclosure can include any one or a combination of the following features:

The plurality of discrete integrated seal carriers are each disposed along a length of the sport tube proximate a location of a retractable window of each of a plurality of removable side doors.
The motor vehicle further comprises a vertical B-pillar operably coupled with and at least partially supporting the sport tube disposed between the A-pillar and the C-pillar, and one of the plurality of discrete integrated seal carriers is disposed along a length of the sport tube between the A-pillar and the B-pillar and another of the plurality of discrete integrated seal carriers is disposed along a length of the sport tube between the B-pillar and the C-pillar.
The motor vehicle further comprises an external trim cover disposed on one or more of the A-pillar, B-pillar, or the C-pillar, wherein the external trim cover comprises a vertical sealing member defining a longitudinally facing and vertically oriented window sealing plane having an upper end disposed proximate the removable door window seal defining the downwardly facing sealing plane.

One of the plurality of external trim covers is disposed on each of the A-pillar, B-pillar, and the C-pillar, and wherein the vertical sealing member of each of the plurality of external trim covers has an upper end disposed proximate the one or the other of the removable door window seal defining the downwardly facing sealing plane.

The vertical sealing member of each of the external trim covers defines a longitudinally facing and vertically oriented window sealing plane facing a window opening between the A-pillar and B-pillar or between the B-pillar and the C-pillar.

According to yet another aspect of the present invention, a roof rail assembly for a motor vehicle has an open frame vehicle architecture and comprises an A-pillar disposed proximate a forward portion of an occupant compartment, a C-pillar disposed proximate a rearward portion of the occupant compartment, a B-pillar intermediate the A-pillar and the C-pillar, a cross-member proximate the A-pillar, and a cross-member proximate the C-pillar. The roof rail assembly comprises an elongated hollow sport tube extending along a longitudinal axis of the motor vehicle, the sport tube comprising a two-piece multi-gage tube extending along a longitudinal length of the occupant compartment of the motor vehicle, the sport tube further comprising an inboard side and an outboard side, and a forward end of the sport tube extends from the A-pillar and a rearward end of the sport tube extends rearward beyond a C-pillar. A side airbag curtain is fixedly coupled with the inboard side of the sport tube, the side airbag curtain having a stowed condition and an inflated condition. A plurality of integrated seal carriers are fixedly coupled with the outboard side of the sport tube and extend laterally outboard of the motor vehicle, each of the plurality of the integrated seal carriers comprising a removable roof sealing member defining in part an upwardly facing sealing plane along the longitudinal axis of the motor vehicle for interface with a sealing member on a removable roof and a removable door window seal defining a downwardly facing sealing plane for interface with a retractable door window, wherein the removable roof sealing member and the removable door window seal act independently of each other.

Embodiments of the third aspect of the present disclosure can include any one or a combination of the following features:

Each of the integrated seal carriers comprises a vertical flange fixedly coupled with the outboard side of the sport tube and a horizontal flange extending laterally outboard of the motor vehicle upon which removable roof sealing member and the removable door window seal are mounted, wherein a distal outboard edge of the horizontal flange is adapted to resiliently flex upwardly in response to a presence of a fully extended door window in a door-closed position.

The removable roof sealing member and the removable door window seal are mounted to the distal outboard edge of the horizontal flange.

The sport tube comprises a forward length having a rearward end and a rearward length having a forward end, wherein either of the rearward end of the forward length or the forward end of the rearward length is received within the other to form a tent-poled joint.

The tent-poled joint of the sport tube is operably coupled with and supported by the C-pillar.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
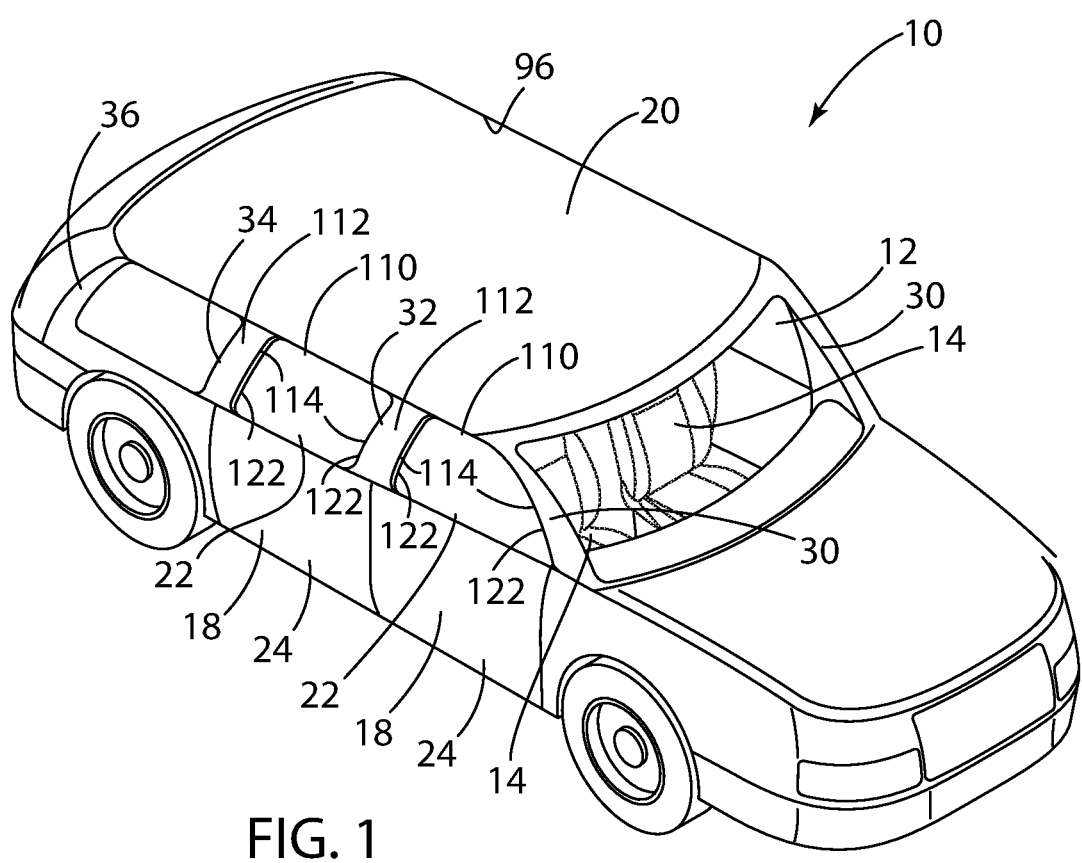
FIG. 1 is a perspective view of a motor vehicle having an open frame vehicle architecture equipped with a removable roof assembly and a plurality of removable side door assemblies in accordance with the present disclosure.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, reference numeral 10 generally designates a motor vehicle. Although illustrated as a six door sport utility type vehicle in FIGS. 1 and 2, the motor vehicle 10 may be another other type of motor vehicle, such as a two or four door motor vehicle or a van, sedan, or truck, such as the four door sports utility type vehicle shown in FIG. 4. The motor vehicle 10, as is typical, includes an occupant compartment 12 within which a plurality of seating assemblies 14 are mounted. The occupant compartment 12 is nominally defined by a floor pan 16, and, as applicable to the present disclosure, a plurality of removable side door assemblies 18 and a removable roof assembly 20. As shown in FIG. 1, and more fully described below, each of the removable side door assemblies 18 may have a frameless window configuration, whereby the removable side door assemblies 18 may be removed from the motor vehicle 10 after the retractable door window 22 of each has been lowered into the body 24 of the respective removable side door assembly 18.

Figure 2:
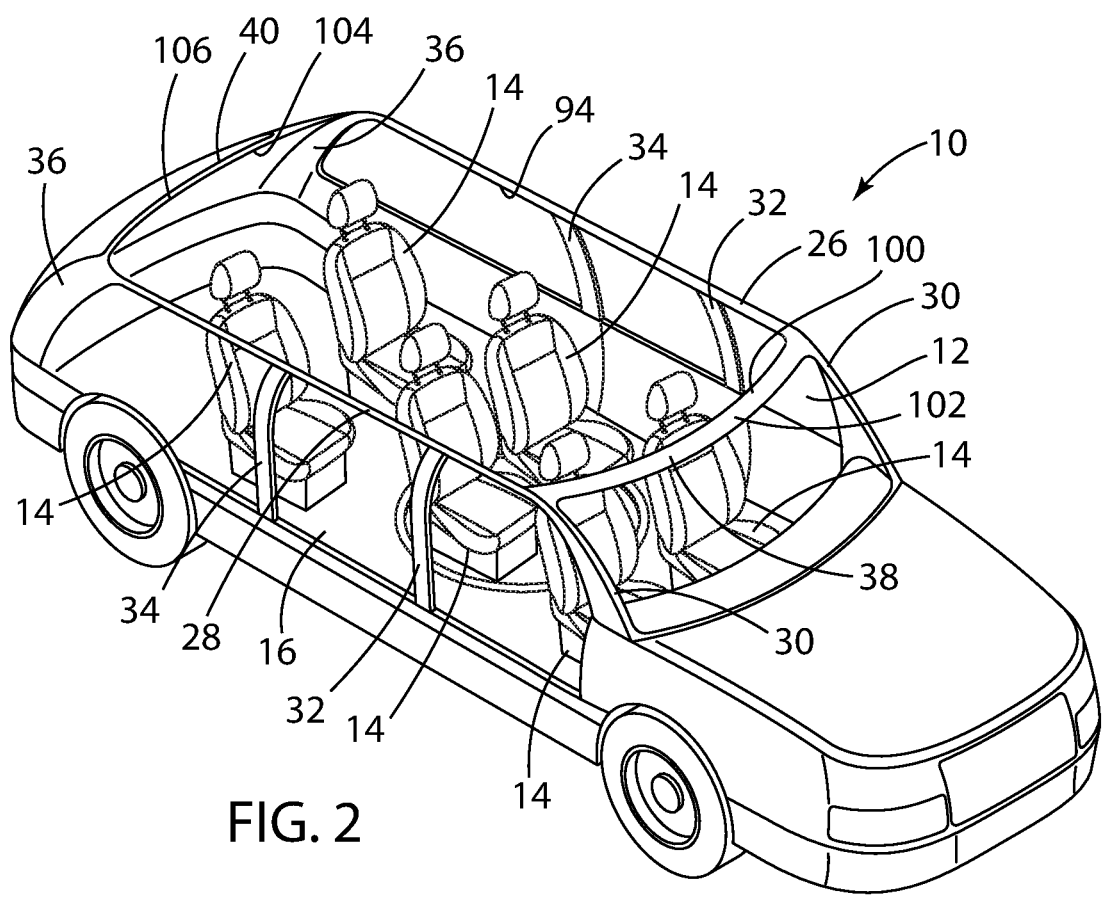
FIG. 2 is a perspective view of the motor vehicle having an open frame vehicle architecture in FIG. 1 with the removable roof assembly and a plurality of removable side door assemblies removed in accordance with the present disclosure.

As schematically shown in FIG. 2, with the plurality of removable side door assemblies 18 and the removable roof assembly 20 removed, the open frame vehicle architecture of the motor vehicle 10 is apparent. A driver roof rail assembly 26 and a passenger roof rail assembly 28 extend horizontally and parallel to the longitudinal axis of the motor vehicle 10 along the sides of the motor vehicle 10 and may be supported by an A-pillar 30, B-pillar 32, C-pillar 34, and D-pillar 36, as shown. A forward cross member 38 and a rearward cross member 40 may extend between the driver roof rail assembly 26 and the passenger roof rail assembly 28, respectively. The driver roof rail assembly 26 and the passenger roof rail assembly 28 are identical mirror images of each other. For purposes of illustrating both, the passenger roof rail assembly 28 will be more fully described.

Figure 3:
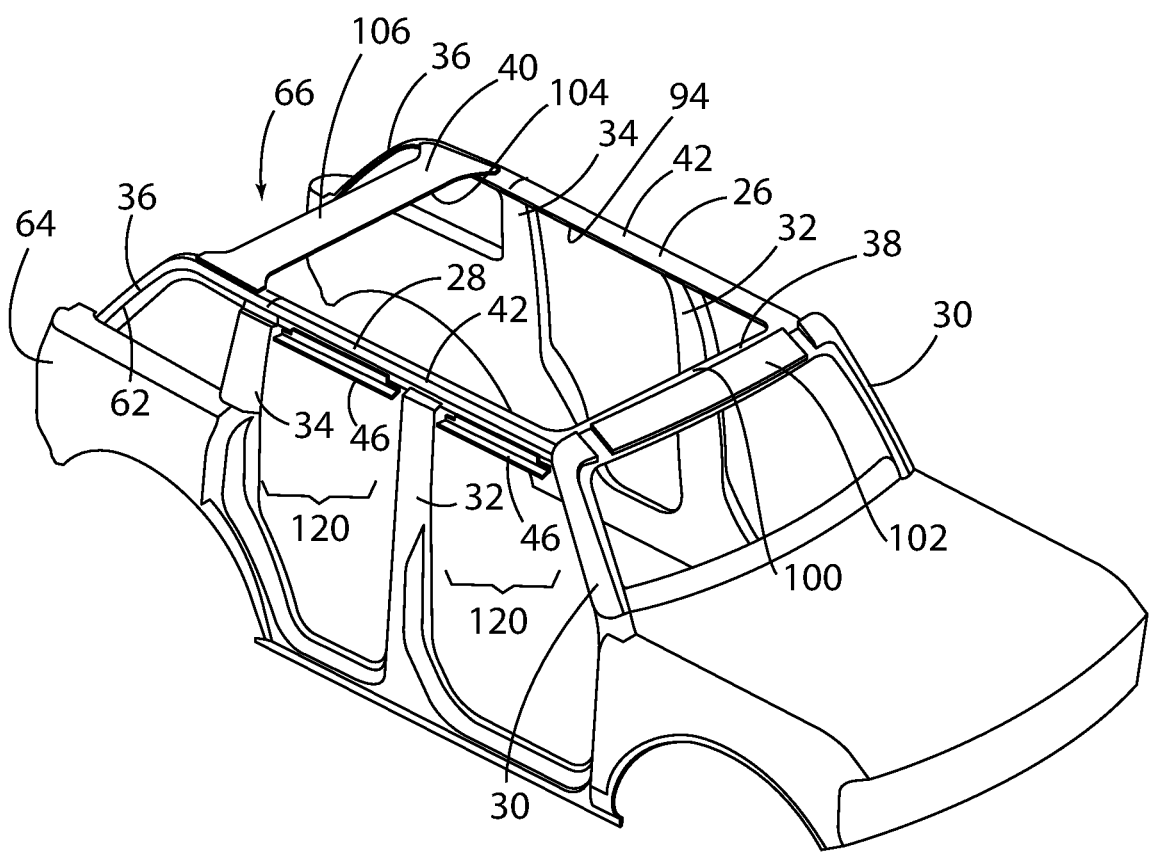
FIG. 3 is a perspective view of a body in white of the motor vehicle having an open frame vehicle architecture in FIG. 1 with the removable roof assembly and plurality of removable side door assemblies removed in accordance with the present disclosure.
Figure 4:
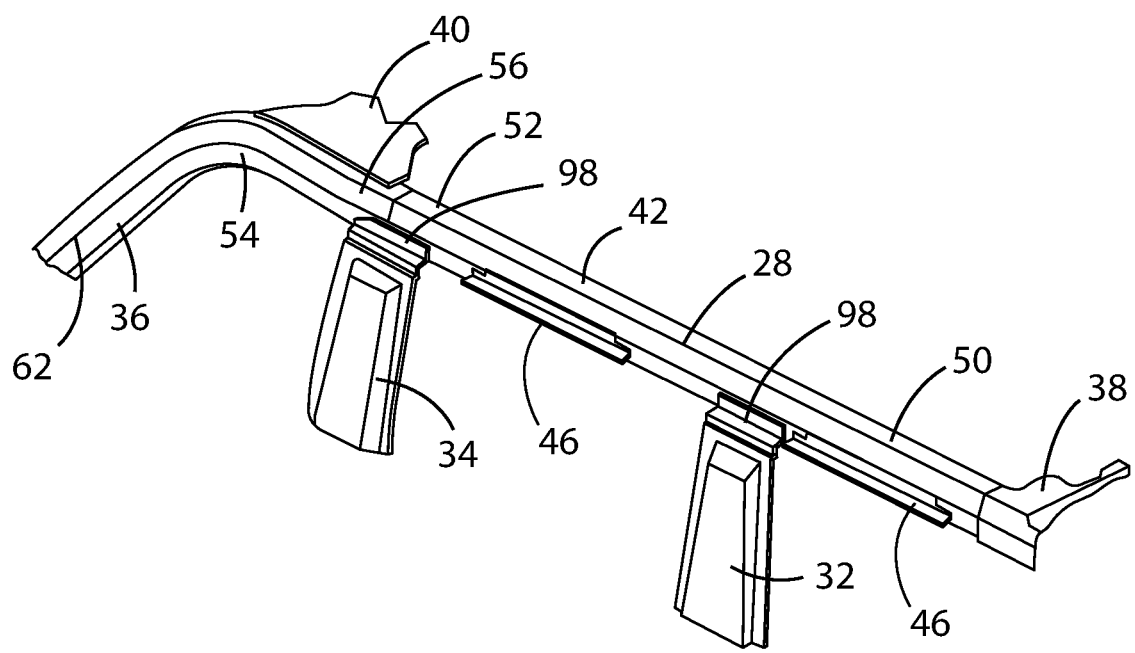
FIG. 4 is a perspective exterior side view of a roof rail assembly in accordance with the present disclosure.
Figure 5:
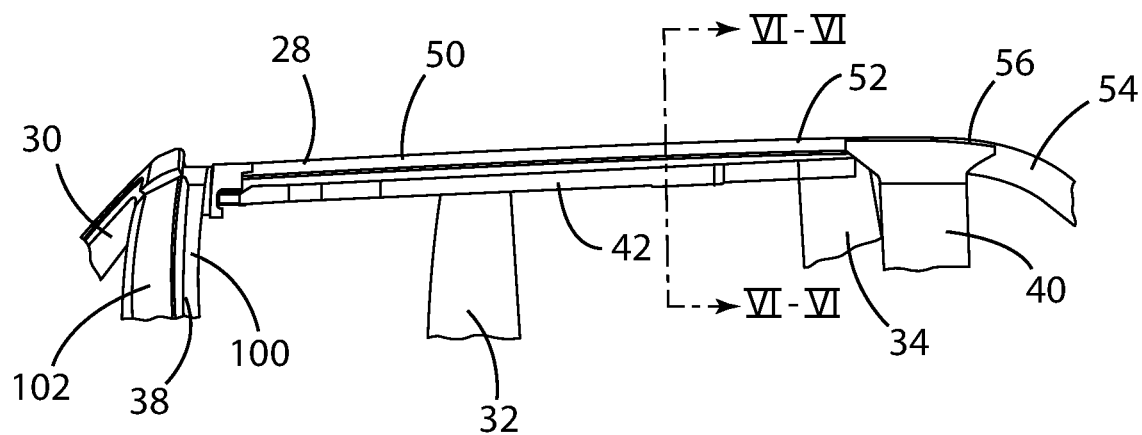
FIG. 5 is an interior side view of a roof rail assembly in accordance with the present disclosure.
Figure 6:
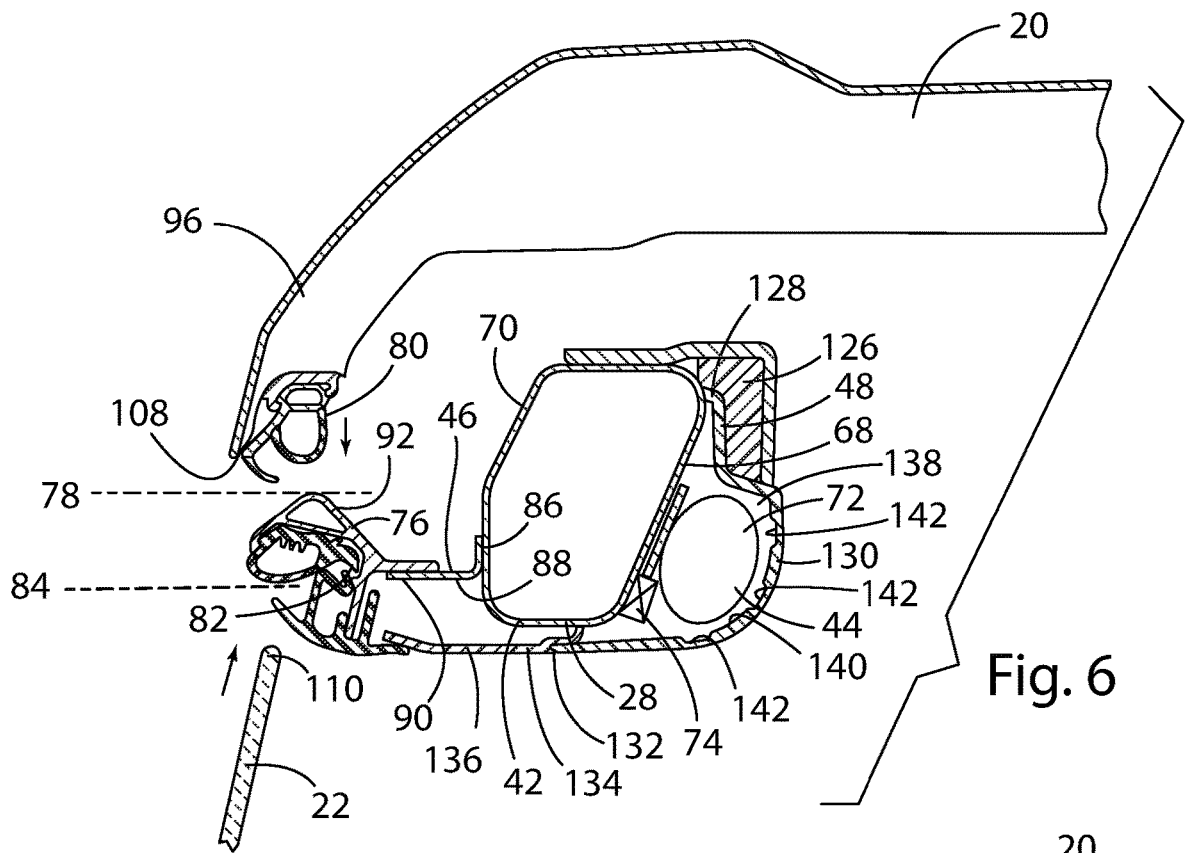
FIG. 6 is a cross-sectional view of the roof rail assembly taken along the line VI-VI in FIG. 5 with the removable roof assembly removed and the retractable door window in a partially retracted position in accordance with the present disclosure.
Figure 7:
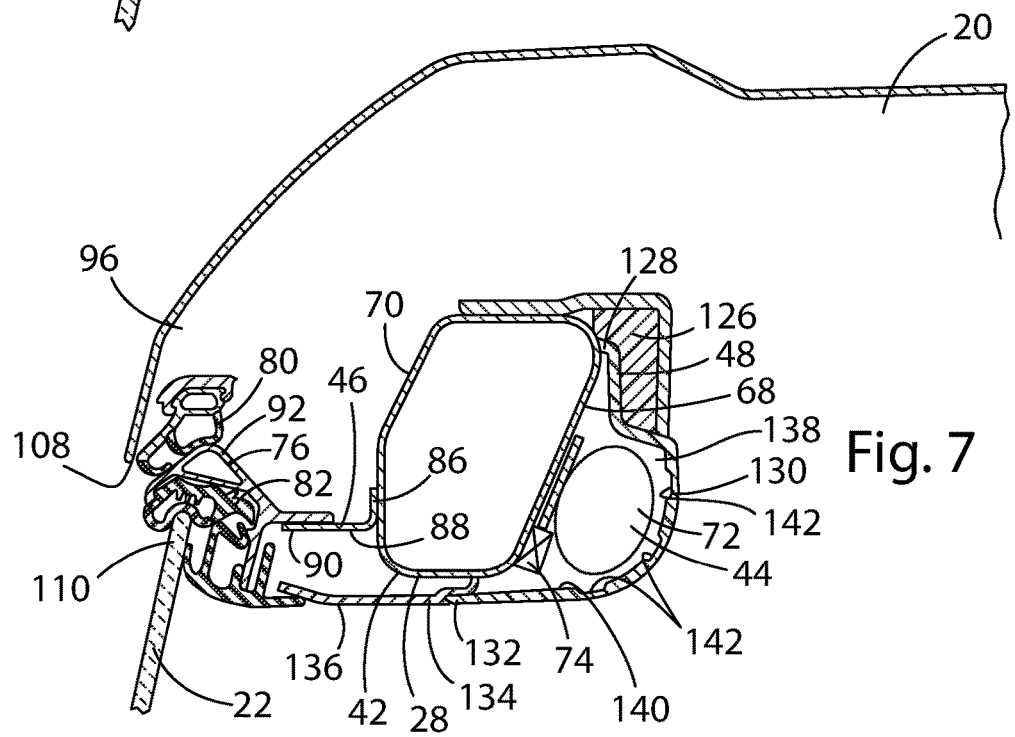
FIG. 7 is a cross-sectional view of the roof rail assembly taken along the line VI-VI in FIG. 5 with the removable roof assembly installed and the retractable door window in a fully extended position in accordance with the present disclosure.

As best shown in FIGS. 3-5, passenger roof rail assembly 28 of a four door sports utility type motor vehicle 10 includes an elongated hollow sport tube 42 that extends horizontally and parallel to the longitudinal axis of the motor vehicle 10. As shown in FIGS. 6-7, a side air curtain assembly 44 and a plurality of integrated seal carriers 46 may be fixedly coupled to the sport tube 42. An interior roof rail trim cover 48 may also be provided to conceal the side air curtain assembly 44, as described below. The sport tube 42 is essentially the structural support for the passenger roof rail assembly 28 and may be fabricated from a metal material, such as steel or aluminum.

Figure 9:
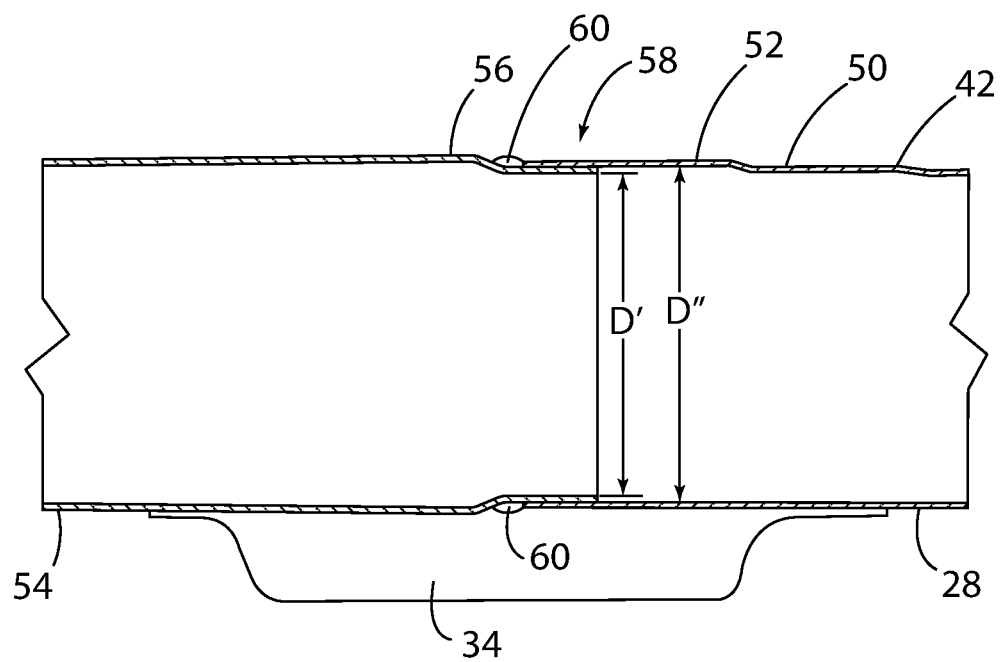
FIG. 9 is a cross-sectional view of the sport tube of the roof rail assembly taken proximate the C-pillar in accordance with the present disclosure.

The sport tube 42 may comprise a two-piece multi-gage tube extending along a longitudinal length of the occupant compartment 12 of the motor vehicle 10, as shown in FIG. 3. That is, the sport tube 42 may further comprise a forward length 50 having a rearward end 52 and a rearward length 54 having a forward end 56. Either of the rearward end 52 of the forward length 50 or the forward end 56 of the rearward length 54 may be provided with a reduced outer diameter D' that may be received within an inner diameter D" of the other to form a tent-poled joint 58, as best seen in FIG. 9, which shows the forward end 56 of the rearward length 54 having a reduced outer diameter D'. The tent-poled joint 58 may be seam welded, such as via MIG welding 60, after assembly. The sport tube 42 may be hot formed into the configuration of the completed sport tube 42 shown in FIG. 3 after the tent-poled joint 58 is formed.

As shown, the motor vehicle 10 has an open frame vehicle architecture and comprises the A-pillar 30 disposed proximate a forward portion of an occupant compartment 12, the C-pillar 34 disposed proximate a rearward portion of the occupant compartment 12, the B-pillar 32 disposed intermediate the A-pillar 30 and the C-pillar 34, the forward cross-member 38 proximate the A-pillar 30, and the rearward cross-member 40 proximate the C-pillar 34. The sport tube 42 may be fixedly attached to the A-pillar 30, B-pillar 32, and the C-pillar 34 via welding techniques and/or via fasteners, as is known, to create a substantially rigid structure partially defining the occupant compartment 12.

Figure 8:
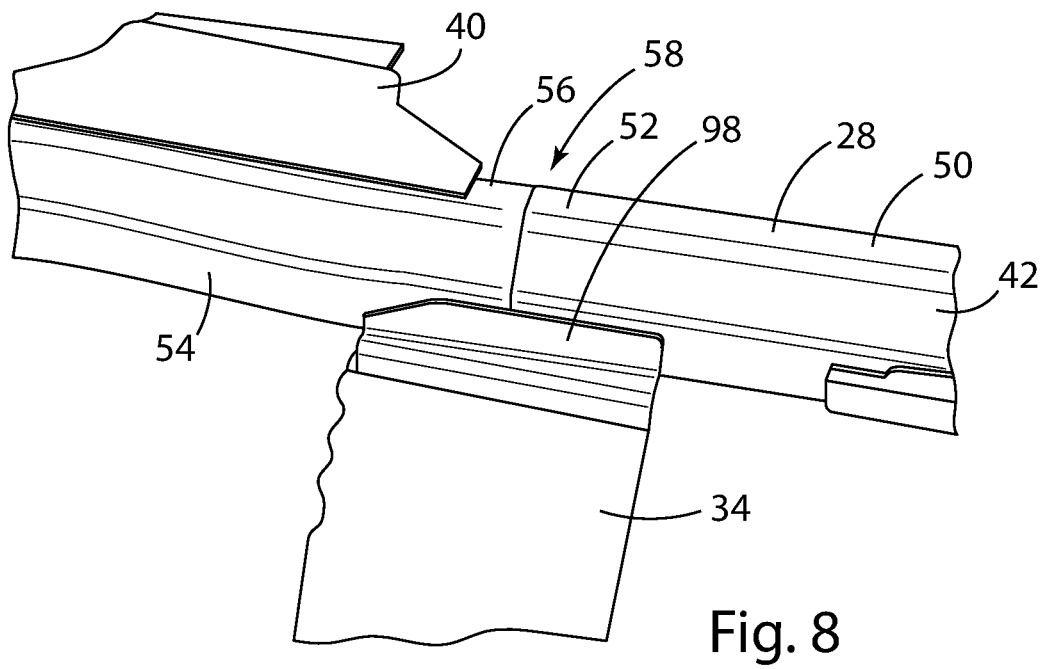
FIG. 8 is a perspective exterior side view of the roof rail assembly and the C-pillar in accordance with the present disclosure.

As shown in FIGS. 3 and 4, the forward length 50 of the sport tube 42 extends substantially horizontally and parallel to the longitudinal axis of the motor vehicle 10, while the rearward length 54 of the sport tube 42 is bent downwardly in the rearward direction at a location rearward of the tent-poled joint 58. A rearward end 62 of the rearward length 54 of the sport tube 42 may thus be similarly fixedly attached to the rear body structure 64 to define the D-pillar 36, which together with the rear body structure 64 may serve to define a rear opening 66 in the motor vehicle 10 that may be enclosed with a rear tailgate/retractable door assembly or a hatch assembly (not shown). As perhaps best shown in FIG. 8, the tent-poled joint 58 of the sport tube 42 may be operably coupled with and directly supported by the C-pillar 34, again via welding techniques and/or via fasteners, as is known. This configuration may provide additional structural integrity for the tent-poled joint 58.

As shown in FIGS. 6 and 7, the sport tube 42 may further comprise an inboard side 68 and an outboard side 70, wherein the side air curtain assembly 44 is fixedly coupled with the inboard side 68 of the sport tube 42 and the plurality of integrated seal carriers 46 are fixedly coupled with the outboard side 70 of the sport tube 42. The side air curtain assembly 44 extends substantially along the horizontal portion of the longitudinal forward length 50 of the sport tube 42. By virtue of the construction of the sport tube 42 described above, an angled and smooth inboard side 68 of the sport tube 42 is provided by which the side air curtain assembly 44 may be mounted directly to the sport tube 42.

The side air curtain assembly 44 includes the side air curtain 72 and an ignitor 74, as is known. The side air curtain assembly 44 has a stowed condition, shown in FIGS. 6-7, and an inflated condition, not shown. The side air curtain assembly 44 may be coupled to the inboard side 68 of the sport tube 42 via a plurality of fasteners (not shown) disposed within a plurality of fastener holes extending longitudinally along the passenger roof rail assembly 28. In particular, the side air curtain assembly 44 may be mounted to a uniform and burr free surface with laser cut holes to accommodate rivet nuts. The sport tube 42 geometry may be designed to optimize the orientation for the side air curtain 72 to encourage rapid deployment in a desired direction. If desired, the rearward cross-member 40 proximate the C-pillar 34 may be used to mount inflating tubes (not shown) for the side air curtain 72.

Each of the plurality of integrated seal carriers 46 is fixedly coupled with the outboard side 70 of the sport tube 42 and extend laterally outboard of the motor vehicle 10, as shown in FIGS. 3, 6, and 7. Each integrated seal carrier 46 comprises a removable roof sealing member 76 defining in part an upwardly facing sealing plane 78 along the longitudinal axis of the motor vehicle 10 for interface with a sealing member 80 on the removable roof assembly 20 and a removable door window seal 82 defining a downwardly facing sealing plane 84 for interface with the retractable door window 22 of one of the removable side door assemblies 18. The removable door window seal 82 may comprise a single component or a multiple components cooperating to form a seal, as shown.

As shown, the sealing member 80 on the removable roof assembly 20 and the removable door window seal 82 are fabricated from a resilient or elastomeric material, while the removable roof sealing member 76 is a more rigid material, such as metal. However, the removable roof sealing member 76 may also include components fabricated from a resilient or elastomeric material. In such case, the sealing member 80 on the removable roof assembly 20 may be a more rigid material, such as metal. Finally, both the removable roof sealing member 76 and the sealing member 80 on the removable roof assembly 20 may be fabricated from a resilient or elastomeric material.

As shown in FIGS. 3 and 4, the passenger roof rail assembly 28 includes the plurality of discrete integrated seal carriers 46 each disposed along a length of the sport tube 42 proximate the location of the retractable door window 22 of each of a plurality of removable side door assemblies 18. For example, one of the plurality of discrete integrated seal carriers 46 may be disposed along a length of the sport tube 42 between the A-pillar 30 and the B-pillar 32 and another of the plurality of discrete integrated seal carriers 46 may be disposed along a length of the sport tube 42 between the B-pillar 32 and the C-pillar 34. In effect, each of the integrated seal carriers 46 is mounted along the sport tube 42 at a location and having a longitudinal length substantially corresponding to a location and a longitudinal length of the retractable door window 22 of one of the removable side door assemblies 18, respectively.

As best shown in FIGS. 6 and 7, the integrated seal carrier 46 comprises a vertical flange 86 fixedly coupled with the outboard side 70 of the sport tube 42 and an integrated horizontal flange 88 extending from the vertical flange 86 laterally outboard of the motor vehicle 10, upon which removable roof sealing member 76 and the removable door window seal 82 are mounted. The removable roof sealing member 76 and the removable door window seal 82 are mounted to a distal outboard edge 90 of the horizontal flange 88.

As shown in FIGS. 6 and 7, the passenger roof rail assembly 28 may also include a mounting bracket 92 fixedly coupled with the distal outboard edge 90 of the horizontal flange 88 to which the removable roof sealing member 76 and the removable door window seal 82 are resiliently coupled and by which the removable roof sealing member 76 and the removable door window seal 82 are supported. As shown, the removable roof sealing member 76 is formed by an upper apex of the mounting bracket 92. The mounting bracket 92 extends laterally in an outboard direction so as to properly position the removable roof sealing member 76 and the removable door window seal 82 for engagement by the sealing member 80 on the removable roof assembly 20 and the retractable door window 22, respectfully.

Thus positioned, the removable roof sealing member 76 defines in part the upwardly facing sealing plane 78 about the upper opening perimeter 94 of the motor vehicle 10 for interface with the sealing member 80 on a perimeter 96 of the removable roof assembly 20. In particular, the removable roof sealing member 76, in combination with a ledge 98 on each of the B-pillar 32 and C-pillar 34, a rearward edge 100 of a forward transverse body panel 102 disposed proximate the forward cross-member 38 proximate the A-pillar 30, and a forward edge 104 of a removable rearward transverse body panel 106 disposed along the rearward cross-member 40 proximate the C-pillar 34, defines the upwardly facing sealing plane 78 about the upper opening perimeter 94 of the motor vehicle 10. This upwardly facing sealing plane 78 is urged into engagement with the sealing member 80 about a perimeter 96 of the removable roof assembly 20 disposed around and under a perimeter edge 108 of the removable roof assembly 20 in order to provide a substantially weather-proof interface and reduce wind noise when the removable roof assembly 20 is installed.

The resulting structure provides a sealing interface between the removable roof assembly 20 and the passenger roof rail assembly 28, while the removable door window seal 82 provides a sealing interface between an upper edge 110 of the retractable door window 22 glass of the removable side door assembly 18 and the passenger roof rail assembly 28. The removable door window seal 82, like each of the plurality of integrated seal carriers 46, may extend a longitudinal length substantially corresponding to the location and longitudinal length of the retractable door window 22 of one of the removable side door assemblies 18.

The distal outboard edge 90 of the horizontal flange 88 may be adapted to resiliently flex upwardly in response to the retractable door window 22 being raised from a retracted position, as shown in FIG. 6, to a fully extended position, as shown in FIG. 7, when the removable side door assembly 18 is in a door-closed position in order to enhance sealing of the upper edge 110 of the retractable door window 22. At the same time, when the removable roof assembly 20 is installed, as shown in FIG. 7, the distal outboard edge 90 of the horizontal flange 88 is adapted to resiliently flex downwardly from the condition shown FIG. 6 in response to the presence of the removable roof assembly 20 in order to enhance sealing of the perimeter 96 of the removable roof assembly 20. The removable roof sealing member 76 and the removable door window seal 82 thus act independently of each other.

Figure 10:
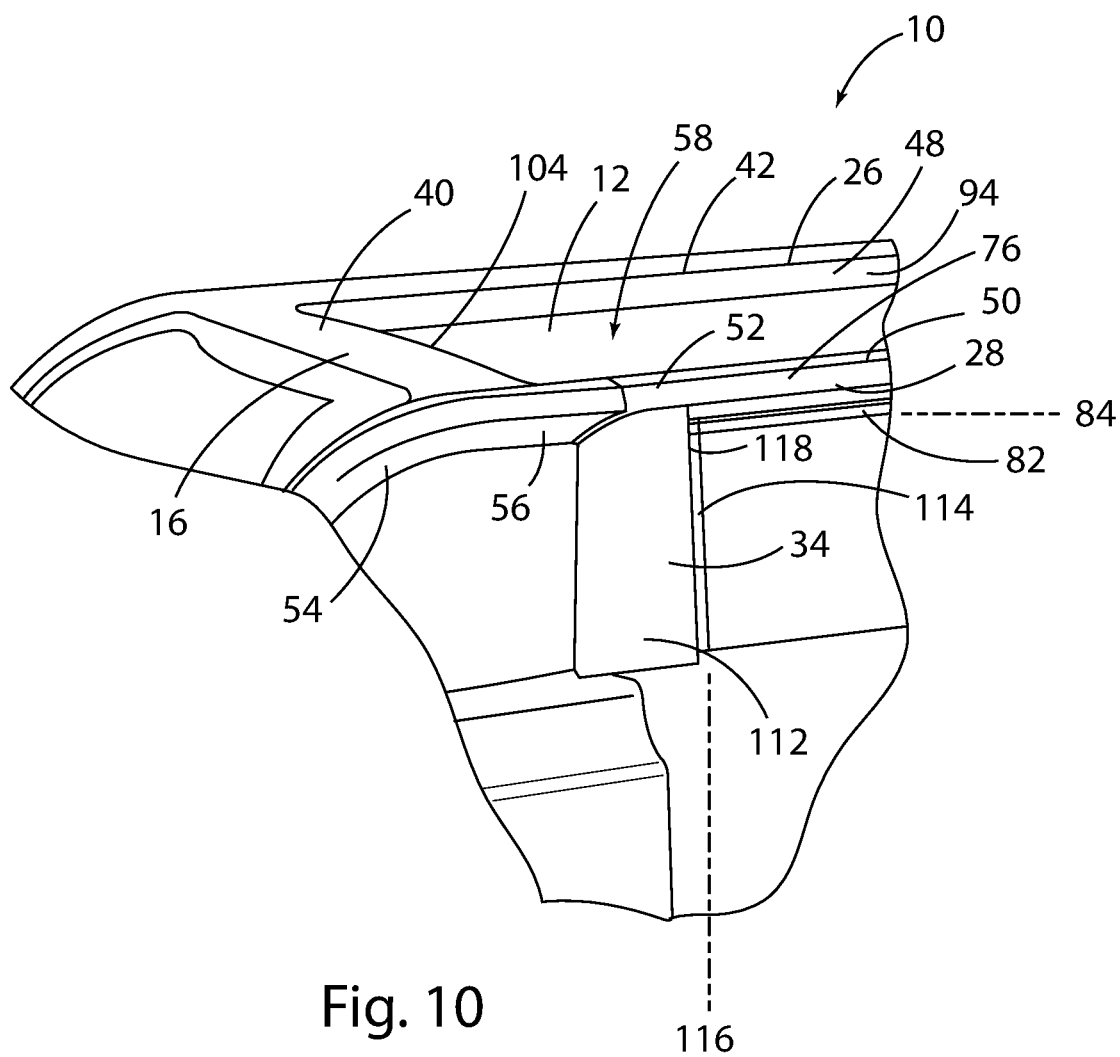
FIG. 10 is a perspective exterior side view the roof rail assembly taken proximate the C-pillar in accordance with the present disclosure.

The motor vehicle 10 may also include an external trim cover 112 disposed on one or more of the A-pillar 30, B-pillar 32, or the C-pillar 34, as shown in FIG. 10. A plurality of external trim covers 112 may be provided, where one of the plurality of external trim covers 112 is disposed on each of the A-pillar 30, B-pillar 32, and the C-pillar 34. The external trim covers 112 may be fabricated from a relatively hard polymer, such as polypropylene.

Each of the external trim covers 112 may include a vertical sealing member 114 defining a longitudinally facing and vertically oriented window sealing plane 116 having an upper end 118 disposed proximate the removable door window seal 82 defining the downwardly facing sealing plane 84. The vertical sealing member 114 of each of the external trim covers 112 thus faces the window opening 120 between the A-pillar 30 and B-pillar 32 or between the B-pillar 32 and the C-pillar 34. Thus, the upper edge 110 and side edges 122 of the retractable door window 22 of the removable side door assembly 18 may be completely, when in the fully raised position, in contact with the removable door window seal 82 and vertical sealing member 114 in order to provide a substantially weather-proof interface and reduce wind noise.

The interior roof rail trim cover 48 may also be provided and likewise fabricated from a relatively hard polymer, such as polypropylene, to allow the side air curtain 72 of the side air curtain assembly 44 to deploy in different environmental conditions and temperatures at the lowest economic impact. The passenger roof rail assembly 28 may also include padding 126 disposed above an upper edge 128 of the interior roof rail trim cover 48 and extending along the longitudinal axis of the motor vehicle 10, wherein the padding 126 may include an energy absorbing material, such as foam.

The interior roof rail trim cover 48 may be operatively coupled with the sport tube 42 via a plurality of fasteners (not shown) disposed in a plurality of fastener holes (not shown) proximate the upper edge 128 of the interior roof rail trim cover 48 and extending longitudinally along the passenger roof rail assembly 28. The interior roof rail trim cover 48 may also include a cover member 130 depending from the upper edge 128 of the interior roof rail trim cover 48 and extending substantially horizontally and parallel to the longitudinal axis of the motor vehicle 10 along the horizontal length of the sport tube 42.

As shown in FIGS. 6-7, the cover member 130 comprises a lower distal edge 132 having a longitudinal length that is received within a fastenerless clip 134 having a longitudinal length disposed below the cover member 130 and operatively coupled with the passenger roof rail assembly 28. The fastenerless clip 134 may be incorporated as a groove into a separate hard-interior trim base 136 fixedly coupled with the passenger roof rail assembly 28 and may be integrally molded therewith. The interior roof rail trim cover 48 and the hard-interior trim base 136 of the passenger roof rail assembly 28 may be formed of a weatherproof material, again such as polypropylene. The lower distal edge 132 of the cover member 130 interacting with the fastenerless clip 134 may include a chamfered surface that is received within the groove disposed on the fastenerless clip 134 to releasably attach the lower distal edge 132 to the passenger roof rail assembly 28 to conceal the side air curtain assembly 44 in the stowed condition within a space 138 behind the cover member 130. The use of a chamfered surface aids in the release of the lower distal edge 132 from the fastenerless clip 134 upon a predetermined force and improve visual appearance.

The cover member 130 conceals the side air curtain assembly 44 in the stowed condition within the space 138 behind the cover member 130, as shown in FIGS. 6 and 7. The forces within the space 138 developed by activation of the side air curtain 72 from the stowed condition to the inflated condition pushes against an inner surface 140 of the cover member 130 and thereby rotates the cover member 130 about a plurality of parallel hinges 142, defined by a plurality of parallel material reduction provided on the inner surface 140 of the cover member 130 extending along the longitudinal length of the cover member 130, to create an opening to allow passage of side air curtain 72 out of the passenger roof rail assembly 28 during activation of the side air curtain 72 from the stowed condition to the inflated condition.

In summary, the use of a sport tube 42 presents unique challenges in providing user desired features. The sport tube 42 described above not only provides a support for a roof structure, but also facilitates the incorporation of additional systems. Package space due to structural requirements, in the past limited for other systems, such as side air curtains 72, both hard and soft removable roof sealing, removable door window sealing, and trim components, are accommodated. The multi-functional sport tube 42 of the present disclosure resolves these package issues with the features mentioned above while providing the necessary roof structure requirements.

The multi-functional sport tube 42 disclosed herein makes it possible to reliably seal the interior of the occupant compartment 12 by mounting the removable door window seal 82 for a frameless retractable side door window 22. By mounting the removable door window seal 82 directly to the sport tube 42, variation between the removable roof assembly 20 and the frameless retractable side door window 22 is isolated between the two systems, in contrast to motor vehicles that employ framed and unframed doors that seal directly to the removable roof assembly 20.

In addition, the presently disclosed sport tube 42 allows the elimination of a cross-member proximate the B-pillar 32, which permits a fuller open air environment when the removable roof assembly 20 is removed. That is, the canopy of the motor vehicle 10 may be completely open, while also maintaining structural integrity, in contrast to motor vehicles 10 that have a cross-member proximate the B-pillar 32 that blocks upward visibility and limit cabin space.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

We claim:

1. A roof rail assembly for a motor vehicle having an open frame vehicle architecture comprising:

an elongated hollow sport tube extending along a longitudinal axis of the motor vehicle, the sport tube comprising a two-piece multi-gage tube extending along a longitudinal length of an occupant compartment of the motor vehicle;

a side airbag curtain fixedly coupled with the sport tube, the side airbag curtain having a stowed condition and an inflated condition; and an integrated seal carrier fixedly coupled with the sport tube and extending laterally outboard of the motor vehicle, the integrated seal carrier comprising a removable roof sealing member and a removable door window seal, wherein the removable roof sealing member and the removable door window seal are independent of one another;

wherein the integrated seal carrier comprises a vertical flange fixedly coupled with the outboard side of the sport tube and a horizontal flange extending laterally outboard of the motor vehicle upon which removable roof sealing member and the removable door window seal are mounted, wherein a distal outboard edge of the horizontal flange is adapted to resiliently flex upwardly in response to a presence of a fully extended door window in a door-closed position; and wherein the removable roof sealing member and the removable door window seal are mounted to the distal outboard edge of the horizontal flange.

2. The roof rail assembly according to claim 1, wherein the sport tube is fabricated from a metal material.

3. The roof rail assembly according to claim 2, the sport tube further comprising an inboard side and an outboard side, wherein the side airbag curtain is fixedly coupled with the inboard side of the sport tube and the integrated seal carrier is fixedly coupled with the outboard side of the sport tube.

4. The roof rail assembly according to claim 3, the sport tube further comprising a forward length having a rearward end and a rearward length having a forward end, wherein either of the rearward end of the forward length or the forward end of the rearward length comprises a reduced outer diameter that may be received within an inner diameter of the other to form a tent-poled joint.

5. The roof rail assembly according to claim 4, wherein the tent-poled joint is seam welded after assembly.

6. The roof rail assembly according to claim 4, wherein the sport tube is hot formed after the tent-poled joint is formed.

7. The roof rail assembly according to claim 1, wherein the side airbag curtain is coupled to an inboard side of the sport tube, and wherein the side airbag curtain extends substantially along a longitudinal length of the sport tube.

8. The roof rail assembly according to claim 1, further comprising a plurality of discrete integrated seal carriers each disposed along a length of the sport tube proximate the location of a retractable door window of each of a plurality of removable side door assemblies, wherein each of the plurality of integrated seal carriers has a longitudinal length substantially corresponding to a location and a longitudinal length of the retractable door window of one of the removable side door assemblies, respectively.

9. The roof rail assembly according to claim 1, wherein the removable roof sealing member of the integrated seal carrier defines in part an upwardly facing sealing plane along the longitudinal axis of the motor vehicle for interface with a sealing member on a removable roof assembly and the removable door window seal defines a downwardly facing sealing plane for interface with a retractable door window, the removable roof sealing member and the removable door window seal acting independently of each other.

10. A roof rail assembly for a motor vehicle having an open frame vehicle architecture comprising:

an elongated hollow two-piece sport tube extending along a longitudinal axis of the motor vehicle, the sport tube comprising an inboard side and an outboard side, and a forward end of the sport tube extends from an A-pillar disposed proximate a forward portion of an occupant compartment and a rearward end of the sport tube extends rearward beyond a C-pillar disposed proximate a rearward portion of the occupant compartment;

a side airbag curtain fixedly coupled with the inboard side of the sport tube, the side airbag curtain having a stowed condition and an inflated condition; and a plurality of integrated seal carriers fixedly coupled with the outboard side of the sport tube and extending laterally outboard of the motor vehicle, each of the plurality of integrated seal carriers comprising a removable roof sealing member defining in part an upwardly facing sealing plane along the longitudinal axis of the motor vehicle for interface with a sealing member on a removable roof and a removable door window seal defining a downwardly facing sealing plane for interface with a retractable door window, wherein the removable roof sealing member and the removable door window seal act independently of each other;

wherein each of the plurality of integrated seal carriers comprises a vertical flange fixedly coupled with the outboard side of the sport tube and a horizontal flange extending laterally outboard of the motor vehicle upon which removable roof sealing member and the removable door window seal are mounted, wherein a distal outboard edge of the horizontal flange is adapted to resiliently flex upwardly in response to a presence of a fully extended door window in a door-closed position; and wherein the removable roof sealing member and the removable door window seal are mounted to the distal outboard edge of the horizontal flange.

11. The roof rail assembly according to claim 10, wherein the plurality of discrete integrated seal carriers are each disposed along a length of the sport tube proximate a location of a retractable window of each of a plurality of removable side doors.

12. The roof rail assembly according to claim 11, wherein the motor vehicle further comprises a vertical B-pillar operably coupled with and at least partially supporting the sport tube disposed between the A-pillar and the C-pillar, and one of the plurality of discrete integrated seal carriers is disposed along a length of the sport tube between the A-pillar and the B-pillar and another of the plurality of discrete integrated seal carriers is disposed along a length of the sport tube between the B-pillar and the C-pillar.

13. The roof rail assembly of claim 12, wherein the motor vehicle further comprises an external trim cover disposed on one or more of the A-pillar, B-pillar, or the C-pillar, wherein the external trim cover comprises a vertical sealing member defining a longitudinally facing and vertically oriented window sealing plane having an upper end disposed proximate the removable door window seal defining the downwardly facing sealing plane.

14. The roof rail assembly of claim 13, further comprising a plurality of external trim covers, wherein a one of the plurality of external trim covers is disposed on each of the A-pillar, B-pillar, and the C-pillar, and wherein the vertical sealing member of each of the plurality of external trim covers has an upper end disposed proximate the one or the other of the removable door window seal defining the downwardly facing sealing plane.

15. The roof rail assembly of claim 14, wherein the vertical sealing member of each of the external trim covers defines a longitudinally facing and vertically oriented window sealing plane facing a window opening between the A-pillar and B-pillar or between the B-pillar and the C-pillar.

16. A roof rail assembly for a motor vehicle having an open frame vehicle architecture and comprising an A-pillar disposed proximate a forward portion of an occupant compartment, a C-pillar disposed proximate a rearward portion of the occupant compartment, a B-pillar intermediate the A-pillar and the C-pillar, a cross-member proximate the A-pillar, and a cross-member proximate the C-pillar, the roof rail assembly comprising;
- an elongated hollow sport tube extending along a longitudinal axis of the motor vehicle, the sport tube comprising a two-piece multi-gage tube extending along a longitudinal length of the occupant compartment of the motor vehicle, the sport tube further comprising an inboard side and an outboard side, and a forward end of the sport tube extends from the A-pillar and a rearward end of the sport tube extends rearward beyond a C-pillar;
- a side airbag curtain fixedly coupled with the inboard side of the sport tube, the side airbag curtain having a stowed condition and an inflated condition; and
- a plurality of integrated seal carriers fixedly coupled with the outboard side of the sport tube and extending laterally outboard of the motor vehicle, each of the plurality of integrated seal carriers comprising a removable roof sealing member defining in part an upwardly facing sealing plane along the longitudinal axis of the motor vehicle for interface with a sealing member on a removable roof and a removable door window seal defining a downwardly facing sealing plane for interface with a retractable door window, wherein the removable roof sealing member and the removable door window seal act independently of each other;
- wherein each of the plurality of integrated seal carriers comprises a vertical flange fixedly coupled with the outboard side of the sport tube and a horizontal flange extending laterally outboard of the motor vehicle upon which removable roof sealing member and the removable door window seal are mounted, wherein a distal outboard edge of the horizontal flange is adapted to resiliently flex upwardly in response to a presence of a fully extended door window in a door-closed position; and
- wherein the removable roof sealing member and the removable door window seal are mounted to the distal outboard edge of the horizontal flange.

17. The roof rail assembly of claim 16, wherein the sport tube comprises a forward length having a rearward end and a rearward length having a forward end, wherein either of the rearward end of the forward length or the forward end of the rearward length is received within the other to form a tent-poled joint.

18. The roof rail assembly of claim 17, wherein the tent-poled joint of the sport tube is operably coupled with and supported by the C-pillar.

* * * * *